United States Patent Office 2,813,115
Patented Nov. 12, 1957

2,813,115

MANUFACTURE OF METHYL BORATE

Robert W. Bragdon, Marblehead, Mass., assignor to Metal Hydrides Incorporated, Beverly, Mass., a corporation of Massachusetts No Drawing. Application January 6, 1956,
Serial No. 557,630

4 Claims. (Cl. 260—462)

This invention relates to the manufacture of trimethly borate by reacting methanol with boric acid or boric oxide.

Heretofore, trimethylborate has been prepared by the method of Schiff, Ann. (Supp.) 5, 154 (1867), who made the boric acid esters by reacting boric anhydride with the alcohol corresponding to the ester desired. The yield is low and the rate of reaction is very slow. The use of a catalyst, such as sulphuric acid, to accelerate the rate of reaction results in undesirable side reactions. Another method for manufacturing trimethyl borate is that described in U. S. Patent No. 2,088,935, where boric acid is reacted with normal butanol in accordance with the method of U. S. Patent No. 1,668,797, and thereafter the normal butyl borate is subjected to an alcoholysis reaction with methanol to produce trimethyl borate. While the reaction of boric acid with butanol proceeds rapidly with a high yield of tributyl borate, the transformation of the latter to trimethyl borate by reaction with methonl proceeds at a slow rate and the yield is low.

The U. S. Patent to Frank J. Appel No. 2,217,354 describes a method for preparing trimethyl borate by reacting boric acid with methanol. According to this method, boric acid and methanol are placed in a stillpot surmounted by a fractionating column and the mixture is placed on total reflux for an extended period of time, such as for 1 or 2 hours depending upon the combined amount of reactants used, and then fractionated for several hours. During this period of fractional distillation a binary mixture of methanol and trimethyl borate is continuously recovered, leaving in the stillpot the water of reaction, excess methanol, and some solids including unreacted boric acid. The ratio of methanol to trimethyl borate in this binary mixture increases and the reaction rate gradually decreases as the distillation period increases. The yield of trimethyl borate, based upon the boric acid used, is low especially when large amounts of reactants are used, such as are required on a commerical production scale. The patent states that the yield may be increased by recycling the recovered methanol and re-utilizing the product remaining in the still. The patent also states that by lengthening the time of esterification, the yeld may be further increased.

The present invention is based upon the surprising discovery that, contrary to the belief of those skilled in the art, boric acid and methanol can be caused to react rapidly under certain conditions and the resulting trimethyl borate can be recovered in substantially quantitative yield based upon the amount of boric acid used. Thus, it has been discovered that a solution of boric acid in methanol can be fed continuously into an intermediate portion of a vertically positioned fractionating column and an anhydrous binary mixture having a substantially constant ratio of methanol to trimethyl borate can be recovered continuously by fractional distillation. Under such conditions, the boric acid and methanol can be caused to react at such a rapid rate that a mixture of methanol and water substantially free of boron can be removed continuously from the bottom of the fractionating column. Yields of about 99% can be consistently obtained at a rapid rate.

In the practice of the invention, it has been found that the yield of trimethyl borate based upon the boric acid used depends upon the degree of fractionation in the portion of the column below the point of feed of the boric acid solution into the column. Thus, the yield is essentially a function of the reflux ratio in the portion of the column below the point of feed of the boric acid solution and is substantially independent of the residence time in this portion of the column and the ratio of distillate to feed. The yield is independent of the reflux ratio in the portion of the column above the point of feed of the boric acid solution but the reflux ratio should be such that the binary mixture of methanol and trimethyl borate is anhydrous. Consequently, by adjusting the reflux ratio in the portion of the column above the point of feed of the boric acid solution and the heat input together with the feed rate for a given feed composition, a person skilled in the art can readily establish and maintain a reflux ratio in the portion of the column below the point of feed of the boric acid solution such that a mixture of methanol and water substantially free of boron can be removed continuously from the bottom of the column. The optimum value of the latter reflux ratio increases with the number of theoretical plates in the column. Superatmospheric and subatmospheric pressures may be employed but a pressure of about 15 p. s. i. g. is presently preferred.

Unless an excessively high fractionating column is used in the practice of the invention, the anhydrous binary mixture of methanol and trimethyl borate recovered contains an amount of methanol greater than that of the azeotrope. Consequently, if the azeotrope is desired, it is preferred to employ a shorter fractionating column and subject the binary mixture recovered to fractional distillation in another fractionating column to separate the excess methanol and recover an anhydrous binary mixture in which the ratio of methanol to trimethyl borate is substantially that of the azeotrope, namely, about one mole of methanol to one mole of trimethyl borate.

However, in the practice of the method of the invention, the rate of reaction is sufficiently rapid that a large excess of methanol is not required to accelerate the reaction. In fact, it is desirable to feed the solution of boric acid in methanol to the fractionating column with as low a ratio of methanol to boric acid as possible to cut down on the heat load and equipment size required to handle a large excess of methanol. A minimum ratio of about 4.19 moles of methanol to one mole of boric acid is required theoretically but the ratio should not be so low that boric acid is precipitated in the column. Substantially quantitative yields have been obtained when the ratio of methanol to boron in the feed composition has been lowered to the boric acid solubility limit at room temperature. In practice, it has been found that a molar ratio of methanol to boric acid of between about 6 to 1 and about 8 to 1 is suitable but a lower or higher ratio is not excluded. The solution may be fed into the column as soon as prepared and no preliminary refluxing or equilibrating period is required. Boric oxide may be used in place or boric acid but the latter is preferred.

The invention is illustrated further by the following specific example. In this run a two-inch, 30 plate, vacuum-jacketed, glass distillation column was used. The solution of boric acid in methanol was fed into the middle of the column at room temperature by means of a rotameter from a constant head feed tank. A condenser was provided at the top of the column and was fitted with a reflux controller operated by a reflux timer. Means were provided for running off a portion of the condensate into a distillate receiver. The reboiler at the bottom of the column was provided with an electrically operated heating mantle by which the heat input could be controlled, the reboiler being provided with means for continuously withdrawing liquor and transferring it to a bottoms receiver.

In the following description of this run, the symbols are used with the following meaning:

O represents the total gram-moles of overflow from one plate to the next plate per unit of time;

V represents gram-moles of vapor passing upward from one plate to the next plate per unit of time;

D represents gram-moles of distillate withdrawn as overhead products per unit of time;

F represents gram-moles of solution fed to column per unit of time;

T means the portion of the colum above the point of feed of the boric acid solution into the column;

B means the portion of the column below the point of feed of the boric acid solution into the column; and W represents the gram-moles of liquor removed from the bottom of the column per unit of time.

In this run a feed solution of boric acid in methanol containing 19.0 percent boric acid was used. Methanol was placed in the reboiler and heated to its boiling temperature. The reflux ratio $(O/V)_B$ was adjusted was adjusted to 1.20, the reflux ratio $O_T/D$ being 10.48 and the reflux ratio $D/F$ being 0.281. These operating conditions were held substantially constant during a period of 4.50 hours. Pertinent data during this period are shown in the following table.

|  | Feed | Distillate | Bottoms |
|---|---|---|---|
| Boric acid (grams) | 955 |  | 8.35 |
| Methanol (grams) | 4,055 | 790 | (*) |
| Trimethyl borate (grams) |  | 1,580 |  |
| Total (grams) | 5,010 | 2,370 | 2,700 |
| Total (gram-moles) | 142 | 39.9 | (*) |
| Boron (grams) | 167 | 164 | 1.46 |

*Not determined.

In the above run $V_T$ (measured) was 458 gram-moles, $O_T$ (measured) was 418 gram-moles, $O_B$ (calculated) was 614 gram-moles and $V_B$ (calculated) was 512 gram-moles. The yield (grams boron in distillate divided by grams boron in distillate plus bottoms) was 99.1 percent. The yield (grams boron in distillate divided by grams boron in feed) was 98.2 percent.

I claim:

1. In a method for producing trimethyl borate, the steps which comprise forming a methanol solution of a compound selected from the group consisting of boric acid and boric oxide, continuously feeding said solution into an intermediate portion of a vertically positioned fractionating column, continuously removing from the column by fractional distillation an anhydrous mixture of methanol and trimethyl borate, continuously removing liquor from the bottom of the column, and establishing and maintaining a reflux ratio in the column below said intermediate portion such that the liquor removed from the bottom of the column is substantially free of boron and consists essentially of methanol and water.

2. In a method for producing trimethyl borate, the steps which comprise forming a methanol solution of boric acid, continuously feeding said solution into an intermediate portion of a vertically positioned fractionating column, continuously removing from the column by fractional distillation an anhydrous mixture of methanol and trimethyl borate, continuously removing liquor from the bottom of the column, and establishing and maintaining a reflux ratio in the column below said intermediate portion such that the liquor removed from the bottom of the column is substantially free of boron and consists essentially of methanol and water.

3. The method claimed by claim 2 wherein the amount of boric acid in said solution is not substantially more than about the maximum amount which is soluble in methanol at room temperature.

4. The method claimed by claim 2 wherein the molar ratio of methanol to boric acid in said solution is between about 6 to 1 and 8 to 1.

References Cited in the file of this patent

UNITED STATES PATENTS

| 2,217,354 | Appel | Oct. 8, 1940 |
| 2,587,753 | O'Connor et al. | Mar. 4, 1952 |